Patented July 2, 1929.

1,719,210

UNITED STATES PATENT OFFICE.

JOSEPH K. BURN, OF ROCKY MOUNT, NORTH CAROLINA.

CEMENTING COMPOUND.

No Drawing.   Application filed October 29, 1927. Serial No. 229,796.

This invention relates to cements used for the purpose of stopping leaks in boilers, engines or vessels that contain steam, gasoline, oils, acids, or any vaporous or liquid matter. The general object of the invention is to provide a cementing compound for this purpose which may be used for stopping up cracks, openings, perforations, etc., which may have formed in the vessel or container, whether this vessel or container be made of metal, wood, glass, clay or any other material, and whether it is ordinarily hot or cold.

My improved cementing compound consists of the following ingredients in approximately the following proportions, namely:—

|  | Parts. |
|---|---|
| Portland cement | 1 |
| Litharge | 2 |
| Powdered iron | 1 |

These ingredients are thoroughly mixed together and with either water glass or shellac as a medium. This forms a paste which may be worked into the crack or other opening in the vessel and which will stop any leak through this opening, which will harden rapidly and permanently repair the vessel or container. The paste can be packed into the crack or other opening by the use of a finger or by a putty knife, and hardens in about fifteen to twenty minutes. This cement will save labor, time and expense in the repair of leaks in boilers, engines, pipes or other vessels. It is particularly adapted for gasoline pipe lines, radiators, and for use under like circumstances.

My reason for using litharge as one of the ingredients in my cement is that litharge, when mixed with water glass, is at first plastic, making possible a thorough mixture of the ingredients used in my cement. At the same time it quickly hardens but after hardening it has a resiliency which does not appear in any other substance with which I have experimented. Therefore, when the cement is used in the stopping of leaks in machines which are dry heated or steam heated or in pipes, steam cylinders, tanks or other objects or receptacles which are subject to expansion or contraction, the cement automatically adapts itself to whatever condition may exist and automatically contracts and expands, precluding a recurrence of the leak previously existing.

The Portland cement is used very materially as a filler but also for its hardening properties. The cement naturally fills in cracks or recesses and has a tendency to adhere to the material under process of repair, whether this material be metal, wood or other substance, yet under certain conditions the cement would be worthless without the other ingredients contained in my cement. Portland cement alone cannot be used for repairing leaks for which my cement compound is designed. Cement alone cannot be used, for instance, to stop a leak in thin material. Portland cement, to be of material value, must have sufficient thickness to stand the strain for which it is used. A very thin application of Portland cement would crack and crumble so that in the repairing of pipes and other thin materials it would be worthless. Furthermore, its properties of expansion and contraction are not sufficient to make it a satisfactory application where such conditions exist.

The powdered iron is used to strengthen and solidify the entire mixture. It gives to it a body and lasting strength, it overcomes the possibility of softening and crumbling, and further its properties of expansion and contraction are positively essential for a perfect cement where the article repaired is subject to changes in temperature. The powdered iron is particularly desirable because when the iron is equally distributed throughout the cement it becomes, when dry, a solid mass with the added advantages of having properties of expansion and contraction not found in cement alone. This powdered iron is preferably in the form of very fine iron filings.

While I may use either liquid sodium silicate or shellac, I prefer to use the liquid sodium silicate, as my experiments have shown it to be the only thing which will stand any temperature without being unsatisfactorily affected. In some operations, however, shellac can be used with success. Water cannot be used in the making of my cement. In the first place, it has no adhesive properties and as the cement must adhere immediately to the parts affected, water cannot be used. Besides, water will not mix with litharge and the compound would be worthless.

This cement is the result of constant experiments made by me over a number of years in my work of welding, in which work every conceivable crack or break which can possibly be repaired is sent in for repair. In very many instances a crack will be in position where the use of a torch is impractical. Several hours will be consumed in the necessary dismantling of the machine before reaching the part affected and then comes the reassembling, which often requires even a greater length of time. With these conditions existing, it became my object to find something which could be used as a time saver and I turned to the cements on the market, hoping to find something of a satisfactory nature. Failing in this, I began experimenting and have produced the cement which forms the subject-matter of this application. There is one very essential property which a cement must possess—it must dry quickly. No other cement known to me dries quickly, while my cement does dry quickly. Where other cements take hours to dry, my cement takes only minutes. An application of my cement will dry and the object repaired be ready for use in from twenty to thirty minutes. Furthermore, a cement to be perfectly satisfactory must be able to withstand sudden jars and vibrations. The cements on the market or otherwise known to me fall far short of such requirements, while mine is perfectly satisfactory regardless of these conditions. An automobile cylinder can be repaired in twenty minutes with no danger of giving way no matter what the vibration or jolting may be. The cylinder so repaired stays repaired.

Attention is also called to the fact that in my cement I use preferably one part of powdered iron to two parts of litharge and one part of Portland cement, or in other words that there is twice as much litharge as there is iron filings. I have found that an over-abundance of iron destroys the resiliency of the litharge and forms a compound which will not stand any material amount of vibration without sifting out of the crack. A cement so compounded will, when dry, mash easily between the fingers to a fine dust. Obviously such a cement cannot give satisfaction. As above stated, my cement does not do this and one of the reasons is that the iron is much less than the litharge.

As before stated, my cement dries quickly, the reason for this being that I use a relatively small proportion of oxide of iron or iron filings. Iron is a natural retainer of moisture and iron filings lie very close together so that when sufficient liquid has been applied to mix the cement for application, these iron filings retain by capillary attraction a large proportion of water. The greater the volume of iron filings, the greater amount of water will be retained and the longer it will take the cement to dry. Litharge dries quickly, so does Portland cement and sodium silicate, and inasmuch as there is in my cement only one part of iron to retain the moisture, the time necessary for drying is reduced to a minimum.

I claim:—

1. A cement including the following ingredients in approximately the following proportions, litharge two parts, Portland cement one part, and powdered iron one part all intimately mixed with a vehicle to form a paste.

2. A cement consisting of the following ingredients in the following proportions, Portland cement one part, litharge two parts and powdered iron one part mixed with liquid silicate of soda to form a paste.

In testimony whereof I hereunto affix my signature.

JOSEPH K. BURN.